Jan. 16, 1945. W. F. H. BRAUN 2,367,562
LAWN MOWER SHARPENER
Filed May 28, 1942
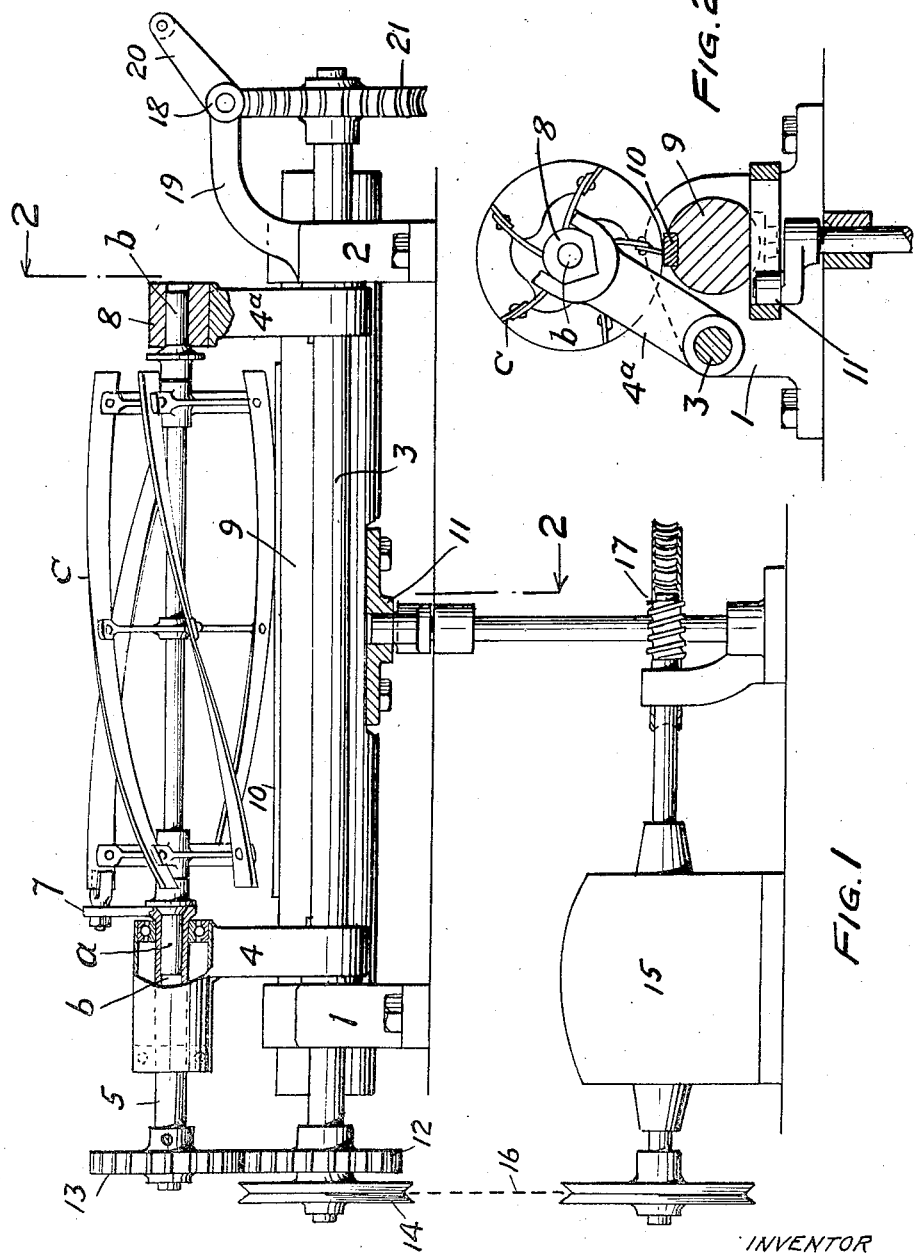
WITNESS:
Rob R Ketchel
INVENTOR
William F. H. Braun
BY
Augustus B. Stoughton
ATTORNEY.

Patented Jan. 16, 1945

2,367,562

UNITED STATES PATENT OFFICE 2,367,562

LAWN MOWER SHARPENER

William F. H. Braun, Wynnewood, Pa.

Application May 28, 1942, Serial No. 444,796

4 Claims. (Cl. 51—67)

The principal objects of the present invention are to substantially reduce the time required for properly sharpening the keen edges of the knives or blades of the rotating cutter of a lawn mower; and to continuously hone as well as grind the keen edges of the knives or blades.

Other objects of the present invention will appear from the following description at the end of which the invention will be claimed.

Generally stated, the invention comprises, a stone longer than the distance between the ends of a cylindrical surface described by the keen edges of the blades or knives of a rotating lawn mower cutter and disposed parallel with the axis of the cutter, and power means for rotating the cutter and for traversing the stone endwise with a quick vibratory motion in respect to said cylindrical surface and in constant range of the keen edge of one or more knives or blades.

The invention also comprises the improvements to be presently described and finally claimed.

In the following description, reference will be made to the accompanying drawing forming part hereof and in which:

Fig. 1 is a side elevation, partly in section, of a machine embodying features of the invention; and Fig. 2 is a sectional view taken on the line 2—2 of Fig. 1.

Referring to the drawing, 1 and 2 are spaced standards and they constitute the frame of the machine. There is a swinging frame pivoted to the standards by a shaft 3 and it is provided with arms of which one, 4, is provided with a driven stub-shaft 5 having a socket 6 for the reception of the end $a$ of the shaft of a lawn mower cutter, and with a crank-arm 7 for rotating the cutter, and of which the other, 4a, is provided with a removable bearing-block 8 for the other end $b$ of the cutter shaft. 9 is a carriage mounted in the standards 1 and 2 for endwise reciprocation and not for rotation. The carriage 9 is provided with an oblong stone 10 arranged parallel to the axis of the shaft 5 and the bore of the bearing-block 8. The stone 10 exceeds in length the distance between the ends of the knives or blades of the cutter. 11 is a crank-arm and slot mechanism for reciprocating the carriage back-and-forth endwise a distance such that the ends of the stone always extend to or beyond the ends of the blades or knives $c$. There is a train of gears of which one, 12, is an idler arranged concentrically with the fulcrum 3 of the swinging frame and of which the other, 13, is fast on the stub-shaft 5. 14 is a pulley on the idler gear 12. A motor 15 is provided with driving connections 16 to the pulley 14 and with driving connections 17 to the crank-and-slot mechanism 11. There is a worm and worm-wheel mechanism of which the worm 18 is supported in a bracket 19 on the standard 2 and is provided with a hand-crank 20. The worm-wheel 21 is fast on the pivot 3 of the swinging frame and meshes with the worm 18.

The mode of operation may be described as follows: The lawn mower cutter is rotated and the keen edges of its blades or knives $c$ describe the path of a cylindrical surface. The stone 10 is reciprocated endwise and its length is such that it traverses that cylindrical surface. In this way, the stone is constantly in full range of the keen edge of one or more of the knives or blades $c$. Thus, the grinding and honing operation is continuous or substantially so and the time required for sharpening the cutter is a matter of 15 or 20 seconds as compared with 4 or 5 minutes required by machines having stones much shorter than the distance between the ends of the knives or blades because such short stones only grind intermittently. The pressure of the keen edges of the knives or blades on the stone 10 may be increased or diminished by means of the worm and worm-wheel mechanism 18-21 operated with accuracy by the handle 20.

In order to mount a cutter in the machine, the end $a$ of its axis is inserted in the socket 6 and the other end $b$ receives the bearing-block 8 which is dropped into its seat on the arm 4a of the swinging frame. Evidently, when the cutter has been sharpened, it can be removed by a reversal of the described procedure. Thus, little or no time is required either in putting the cutters into, or taking them out of, the machine or in sharpening or honing the keen edges of their knives or blades.

It may be remarked that the speed of the shaft and cutter is, for example, 2000 R. P. M. and the speed of reciprocation of the stone is, for example, 250 per minute.

It will be obvious to those skilled in the art that modifications may be made in details of construction and in matters of mere form without departing from the spirit of the invention.

I claim:

1. A lawn mower sharpener comprising, spaced standards, a swinging frame carried by the standards and provided with arms of which one is equipped with a driven stub shaft having a socket and a crank-arm, and of which the other is provided with a removable bearing-block, a carriage mounted in said standards for endwise reciprocation and provided with an oblong stone arranged parallel to the axis of the stub-shaft and the bore of the bearing-block, said stone exceeding in length the distance between the ends of the knives or blades of a lawn mower cutter, means for reciprocating the carriage back-and-forth a distance such that the ends of the stone always extend beyond the ends of the blades or knives, means for rotating the stub-shaft, mechanism for reciprocating the carriage, and devices for swinging the frame to adjust the pressure of the keen edges of the knives or blades on the stone.

2. A sharpener and external honer comprising, means for rotating the surface of a body in a cylindrical path, an oblong stone, pivotal arms at the free ends of which the body is carried, means for holding the stone against rotation, power means continuously oscillating the stone endwise with a quick vibratory motion and in parallelism with the axis of rotation of the body and in constant range of the cylindrical path, and manually operated mechanism for turning the arms to feed the body.

3. A sharpener and external honer comprising, means for rotating the surface of a body in a cylindrical path, an oblong stone, pivotal arms at the free ends of which the body is carried, means for holding the stone against rotation, crank mechanism continuously oscillating the stone endwise with a quick vibratory motion and in parallelism with the axis of rotation of the body and in constant range of the cylindrical path, and manually operated mechanism for turning the arms to feed the body.

4. A sharpener and external honer comprising, means for rotating the surface of a body in a cylindrical path at a speed of the order of 2,000 R. P. M., an oblong stone, pivotal arms at the free ends of which the body is carried, means for holding the stone against rotation, power means continuously oscillating the stone endwise with a quick vibratory motion of the order of 250 vibrations per minute and in parallelism with the axis of rotation of the body and in constant range of the cylindrical path, and manually operated mechanism for turning the arms to feed the body.

WILLIAM F. H. BRAUN.